United States Patent [19]

Akiyama

[11] Patent Number: 5,576,760
[45] Date of Patent: Nov. 19, 1996

[54] HIGH RESOLUTION TELEVISION CAMERA USING FRAME MEMORY

[75] Inventor: Ikuo Akiyama, Tokyo, Japan

[73] Assignee: NEC Corporation, Tokyo, Japan

[21] Appl. No.: 494,247

[22] Filed: Jun. 23, 1995

[30] Foreign Application Priority Data

Jun. 23, 1994 [JP] Japan .................................. 6-141426

[51] Int. Cl.$^6$ .................................................. H04N 5/228
[52] U.S. Cl. ............................................. 348/231; 348/222
[58] Field of Search ..................................... 348/222, 231, 348/229, 230; H04N 5/76, 5/228

[56] References Cited

U.S. PATENT DOCUMENTS 5,343,243  8/1994  Maeda ..................................... 348/222

FOREIGN PATENT DOCUMENTS

64-78081  3/1989  Japan .

Primary Examiner—John K. Peng
Assistant Examiner—Sherrie Hsia
Attorney, Agent, or Firm—Sughrue, Mion, Zinn, Macpeak & Seas

[57] ABSTRACT

A high sensitivity television camera utilizing storage time control system improves the sensitivity without degradation of resolution. Storage time of signal charge in a CCD image pick-up element which is scanned progressively is controlled. An amount of signal charge stored during the storage time is read out and stored in a pair of frame memories alternately as frame data. A pair of data of adjacent lines stored in the frame memory are read out and delayed by shift registers by 1 clock. Image data are produced from the vertically and horizontally adjacent four pixels which are delayed data and non-delayed data. The image data have a configuration corresponding to the interlace scan.

4 Claims, 7 Drawing Sheets

HIGH RESOLUTION TELEVISION CAMERA USING FRAME MEMORY

BACKGROUND OF THE INVENTION

The present invention relates to a high sensitivity television camera and, more particularly, to a high sensitivity television camera utilizing a storage time control system.

Figures 3, 4, 5:
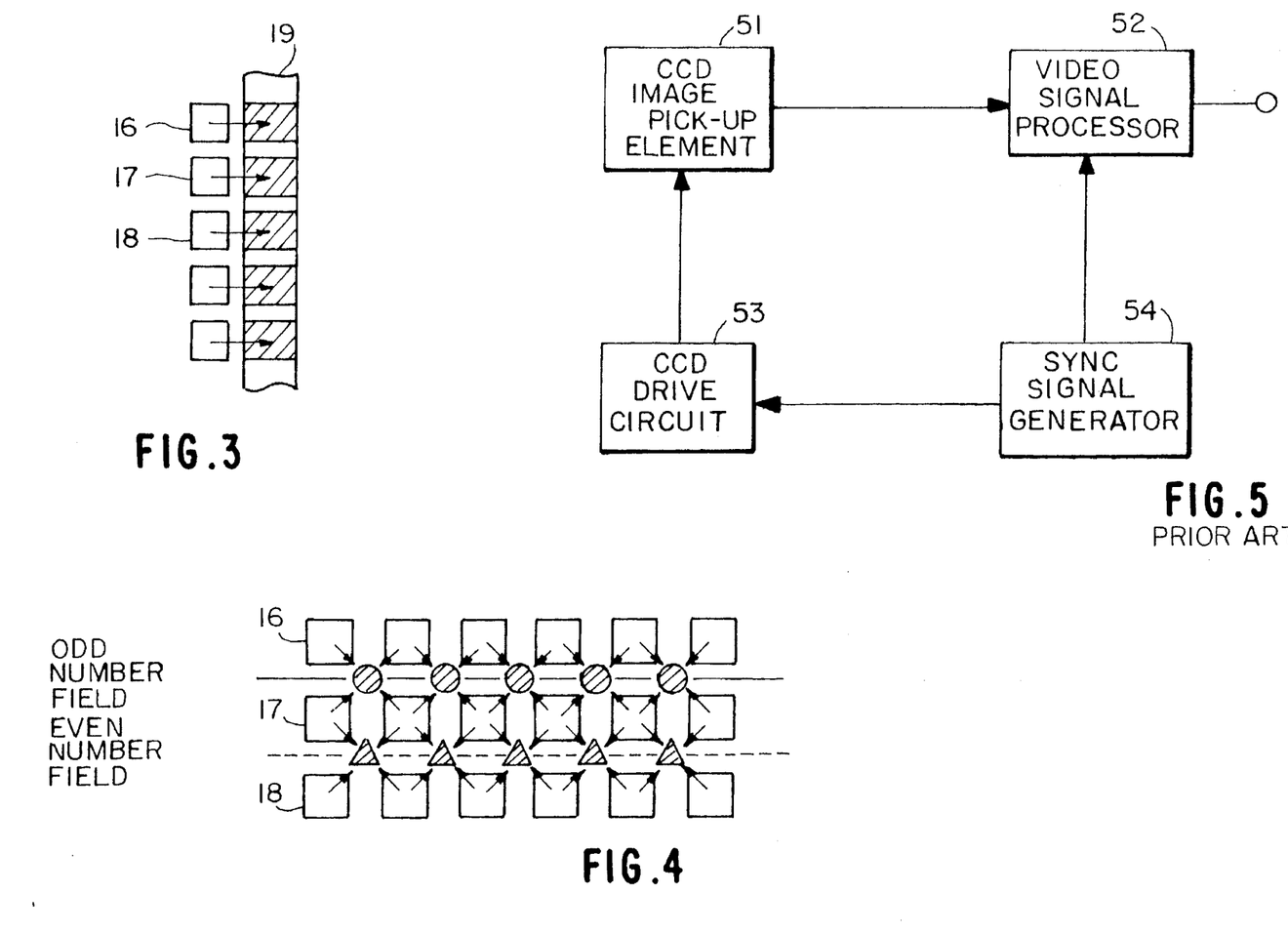
FIG. 3 is a conceptual illustration for explaining an operation of a CCD image pick-up element shown in FIG. 1.
FIG. 4 is a conceptual illustration for explaining an operation of an adder circuit shown in FIG. 1.
FIG. 5 is a block diagram of a conventional television camera.

An example of a construction of a conventional CCD (charge coupled device) television camera is shown in FIG. 5. The CCD television camera shown in FIG. 5 is constituted with a CCD pick-up element 51 for converting an image into an electric video signal, an image signal processing circuit 52 for processing the video signal input from the CCD pick-up element 51 in various manner, a CCD drive circuit 53 for controlling a pick-up operation of the CCD pick-up element 51 and a sync signal generator circuit 54 for generating a sync signal for synchronizing operations therein.

Figure 6:
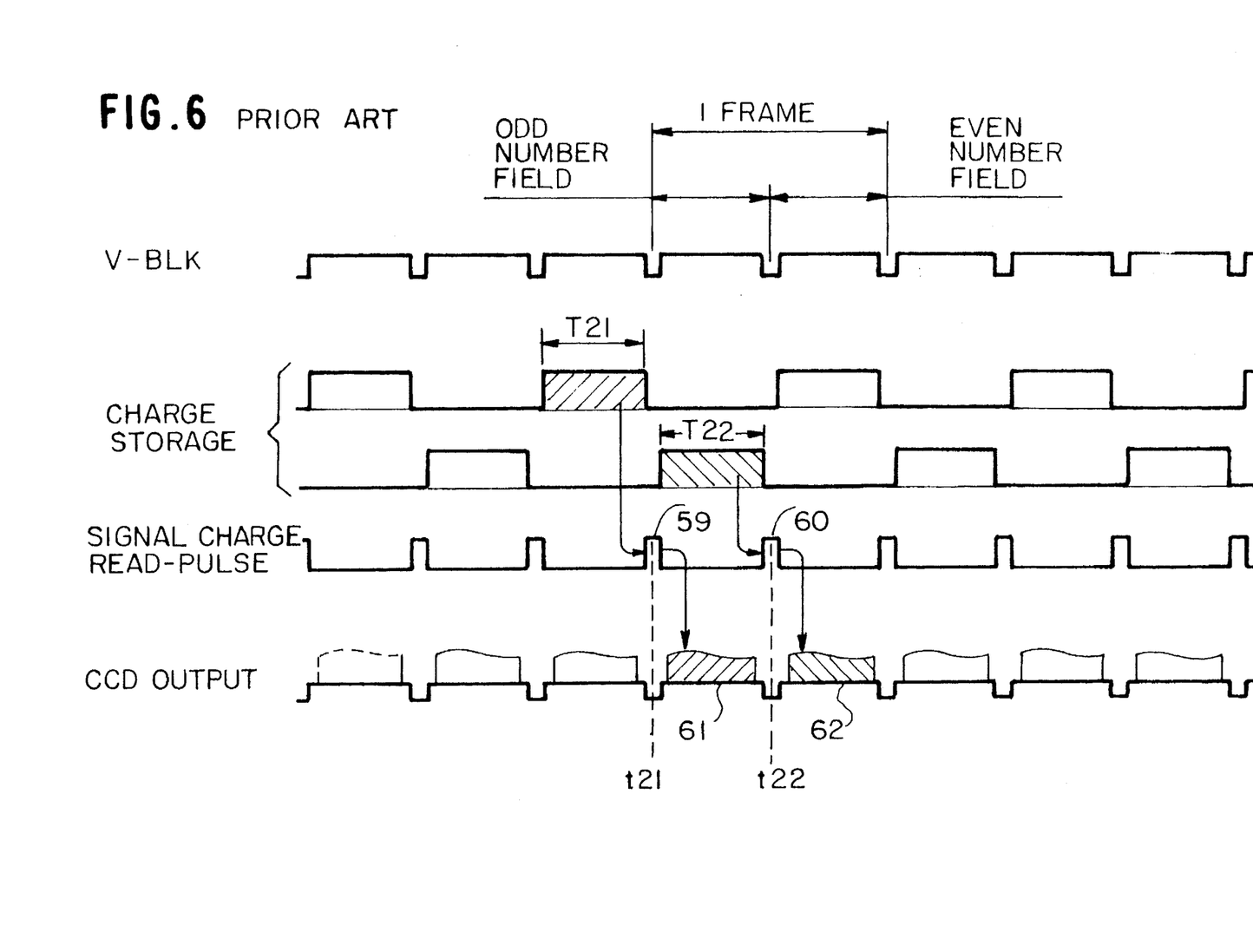
FIG. 6 is a timing chart for explaining an operation of the conventional television camera shown in FIG. 5.
Figure 7:
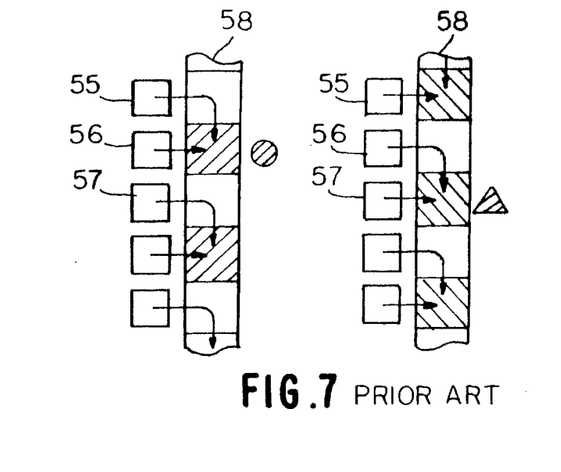
FIG. 7 is a conceptual illustration for explaining an operation of a CCD image pick-up element shown in FIG. 5.

FIGS. 6 to 8 show an operation of the CCD television camera shown in FIG. 5, particularly, shows a so-called field storage mode operation. Signal charge stored in photo diodes 55 and 56 shown in FIG. 7 during a field period T21 (1/60 seconds) shown in FIG. 6 is read out to a vertical CCD 58 by a signal charge read pulse 59 at a time instance t21 and then added in the same CCD. The resultant signal charge is shown by a black circle ● in FIG. 7. This signal charge is transferred through the vertical CCD 58 and a horizontal CCD (not shown) sequentially in the known manner and then is output externally as a video signal 61 of an odd number field.

Similarly, signal charge stored in photo diodes 56 and 57 shown in FIG. 7 during a field period T22 (1/60 seconds) is read out to the vertical CCD 58 by a signal charge read pulse 60 at a time instance t22 and then added in the same CCD. The resultant signal charge is shown by a black triangle ▲ in FIG. 7. This signal charge is transferred through the vertical CCD 58 and the horizontal CCD (not shown) sequentially in the known manner and then is output externally as a video signal 62 of an even number field.

Figure 8:
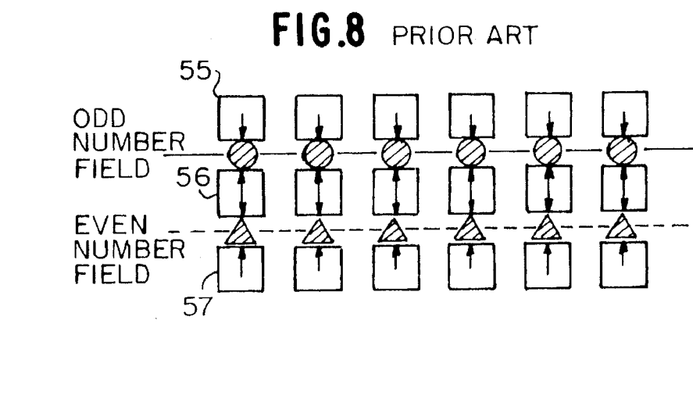
FIG. 8 is a conceptual illustration for explaining an adding operation of signal charge in the television camera shown in FIG. 5.

According to the operation in the field storage mode mentioned above, the adding direction of pixels in the odd number field is offset vertically from that in the even number field by 1 line, as shown in FIG. 8. For this reason, in a case of a CCD of NTSC system in which, for example, 490 pixels are arranged vertically, the vertical resoltuion becomes in the order of 350 TV.

Figure 9:
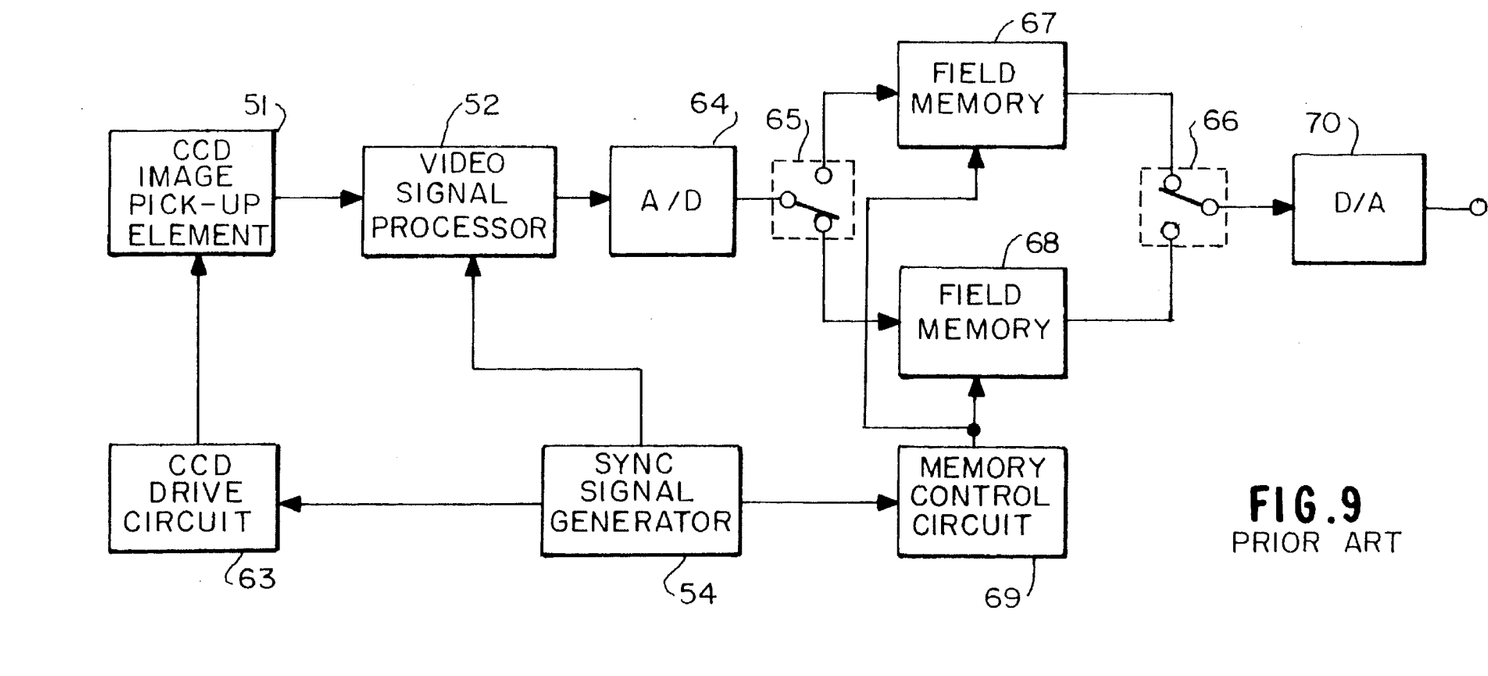
FIG. 9 is a block diagram of a conventional high sensitivity television camera.

FIG. 9 shows a construction of a conventional high sensitivity CCD television camera utilizing storage time control system, which comprises, in addition to components depicted by the same reference numerals as those shown in FIG. 5, a CCD drive circuit 63 having a storage time control function, an A/D converter 64, signal switches 65 and 66, field memories 67 and 68, a memory control circuit 69 and a D/A converter 70.

Figure 10:
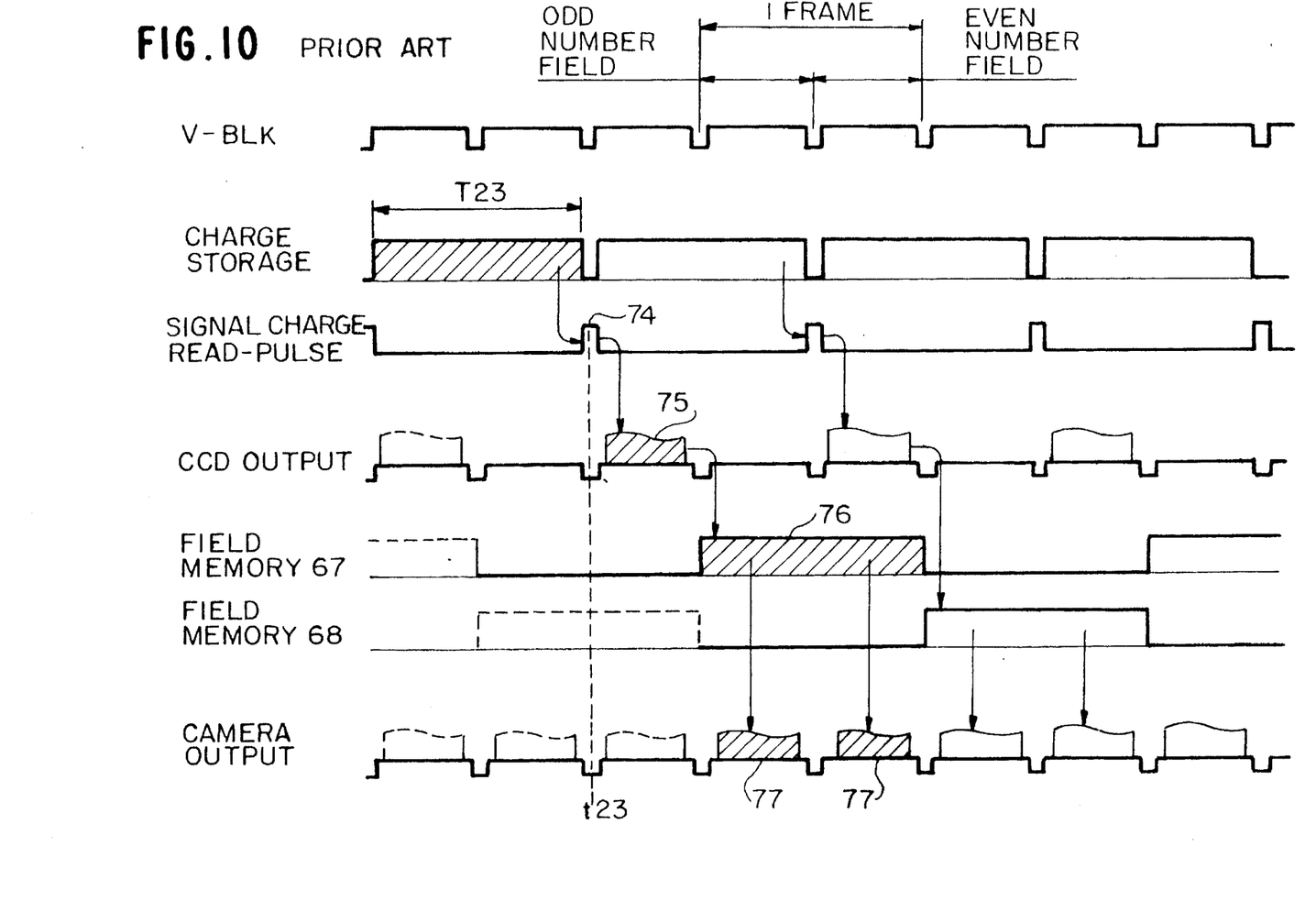
FIG. 10 is a timing chart for explaining an operation of the conventional high sensitivity television camera shown in FIG. 10.
Figure 11:
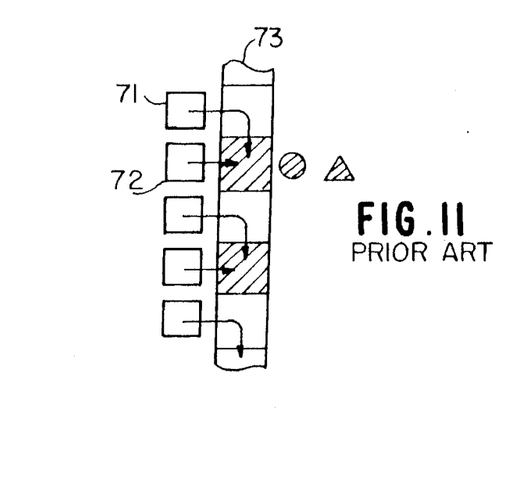
FIG. 11 is a conceptual illustration for explaining an operation of a CCD image pick-up element shown in FIG. 9.

FIGS. 10 to 12 show an operation of the high sensitivity CCD television camera shown in FIG. 9 for a case where the sensitivity is twice the case of the normal drive shown in FIGS. 5 and 6 to 8, that is, where the charge storage time is 1/30 seconds. In FIG. 10, signal charge stored in photo diodes 71 and 72 shown in FIG. 11 during a charge storage time T23 (1/30 seconds) is read out to a vertical CCD 73 by a signal charge read pulse 74 at a time instance t23 every 1/30 seconds and then added in the same CCD 73. The resultant signal charge is shown by a black circle ● and black triangle ▲ in FIG. 11.

This signal charge is transferred through the vertical CCD 73 and a horizontal CCD (not shown) sequentially in the known manner and then is output as an analog video signal 75 from the CCD pick-up element 51 intermittently at a rate of once per frame. The analog video signal 75 is converted into a digital video signal by the A/D converter 64 and the resultant digital video signal is written in the field memories 67 and 68 alternately through the signal switch 65.

In order to convert the intermittent signal into a continuous signal, the digital video signal 76 stored in the field memory 67 is output through the signal switch 66 and the D/A converter 70 under control of the memory control circuit 69 as an analog video signal 77 which is the same in both the odd number and even number fields.

Japanese Patent Application Laid-open No. S64-78081 (1989) discloses a technique belonging to the technical field of the present invention. In the above-mentioned article, a control circuit which reads out electric charge from a solid state image pick-up element to be output every an integer multiple of field or frame period is used so that electric charge is read out in a high sensitive mode.

Figure 12:
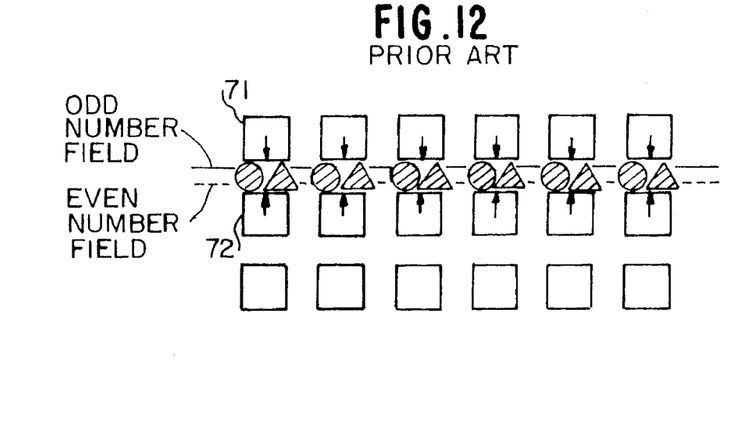
FIG. 12 is a conceptual illustration for explaining an adding operation of signal charge in the television camera shown in FIG. 9.

In the high sensitivity CCD television camera of the conventional storage time control system, however, the vertical resolution is extremely degraded since the same video signal is output in odd number field and even number field, although the sensitivity itself is improved proportionally to the storage time. That is, as shown in FIG. 12, the pixel sum in the vertical direction is fixed for odd number field and even number field. Therefore, in the CCD of the NTSC system in which 490 pixels, for example, are arranged in vertical direction, the vertical resolution is degraded to as low as about 245 TV.

SUMMARY OF THE INVENTION

An object of the present invention is to provide a high sensitivity television camera utilizing storage time control system, which can achieve a desired high sensitivity without degrading resolution.

In order to achieve the above object, a high sensitivity television camera according to the present invention comprises an image pick-up means capable of being scanned progressively, storage time control means for controlling signal charge storage time of the image pick-up means, a frame memory means for storing an image data obtained by reading an amount of electric signal charge stored within a storage time and adder means for adding the image data corresponding to 4 pixels of the image data stored in the frame memory means, which are adjacent vertically and horizontally to each other in a frame, wherein an output signal is formed from the image data added by the adder means.

According to the present invention, the combining processing of the image data of the four pixels is preferably performed correspondingly to the odd number field and even number field in an interlace scan.

Therefore, according to the high sensitivity television camera of the present invention, signal charge of the pick-up means capable of being scanned progressively is read out and the corresponding image data are temporarily stored in the frame memory. The image data of 4 pixels of the image data stored in the frame memory, which are adjacent vertically and horizontally to each other in a frame, are read out and summed so to produce an output signal of the NTSC system. Therefore, the output signal thus obtained is improved in sensitivity by the addition of the data of the adjacent four pixels and the degradation of resolution is prevented by the addition processing.

DETAILED DESCRIPTION OF THE PREFERRED EMBODIMENTS

Embodiments of the high sensitivity television camera according to the present invention will be described in detail with reference to the accompanying drawings. An embodiment of the high sensitivity television camera of the present invention is shown in FIGS. 1 to 3.

Figure 1:
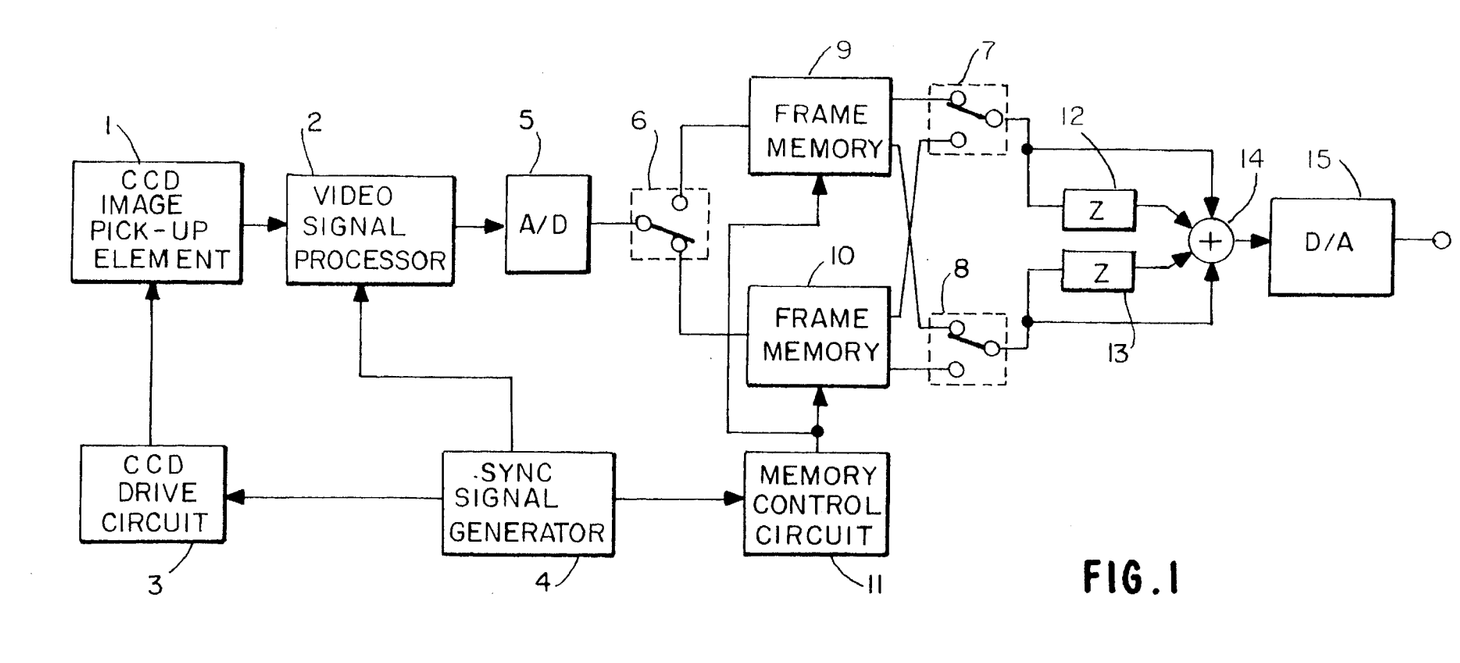
FIG. 1 is a block diagram of an embodiment of the high sensitivity television camera according to the present invention.
Figure 2:
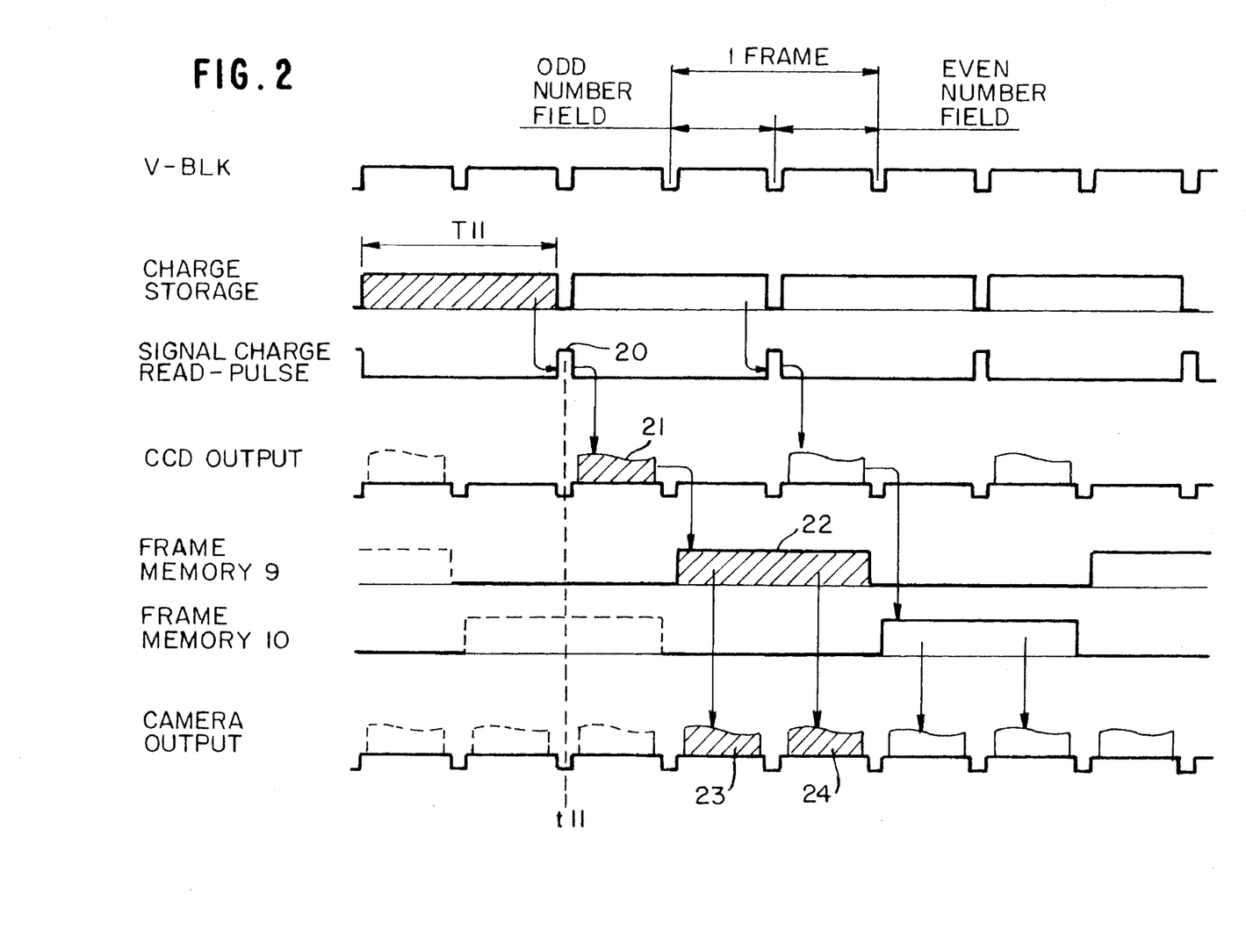
FIG. 2 is a timing chart for explaining an operation of the embodiment shown in FIG. 1.

Referring to FIG. 1 showing a block diagram of the embodiment, a high sensitivity CCD television camera usilizing storage time control system comprises a CCD image pick-up element 1 capable of being progressive-scanned, a video signal processing circuit 2 for processing a video signal input from the CCD image pick-up element 1 in various manners, a CCD drive circuit 3 having storage time control function, a sync signal generator circuit 4, an A/D converter 5, signal switches 6, 7 and 8 for switching signal transmission lines, frame memories 9 and 10, shift registers 12 and 13 each functioning as a 1-bit delay circuit, an adder circuit 14 and a D/A converter 15.

The CCD image pick-up element 1 converts a picked-up image into an electric video signal. Further, the CCD image pick-up element 1 is scanned progressively. Therefore, the CCD image pick-up element 1 has a function of reading signal charge from each of vertically adjacent pixels independently without summing them, that is, reading all pixels, unlike a CCD corresponding to the conventional interlace scanning.

The video signal processing circuit 2 receives signal charge output from the CCD image pick-up element 1 and outputs it as an analog video signal by processing the input signal charge in a known manner. The CCD drive circuit 3 is a control circuit for the CCD image pick-up element 1 and controls a storage time of electric charge thereof. The storage time and an output operation of the CCD image pick-up element 1 is controlled by an output signal of the CCD drive circuit 3. The sync signal generator circuit 4 generates a reference signal for synchronizing operations of various circuit portions of the high sensitivity television camera. The processing of the various circuit portions is performed in synchronism with the reference signal having a predetermined frequency. The A/D converter 5 converts an analog video signal into a digital video signal and the D/A converter 15 converts a digital video signal into an analog video signal.

The frame memories 9 and 10 temporarily store image data of one frame, alternately. The memory control circuit 11 controls the storing operations of these frame memories 9 and 10. Each of the shift registers 12 and 13 is the 1-bit delay circuit for delaying image data read out from the frame memory 9 or 10 by 1 bit. Two pixels on adjacent lines read-out from the frame memory 9 or 10 and the two corresponding delayed pixels from the respective shift registers 12 and 13 constitute a set of four data of adjacent four pixels on one frame. The adder circuit 14 adds the four data of four adjacent pixels and outputs one image data.

An operation of the embodiment of the high sensitivity CCD television camera shown in FIG. 1 constituted as mentioned above will be described with reference to FIGS. 2 to 4. In this case, the sensitivity is twice that in a case of a usual driving which is shown in FIGS. 5 to 8. Namely, the charge storage time is 1/30 seconds. FIG. 2 showing a timing chart of operations of main portions shown in FIG. 1, shows a timing of a vertical blanking (V-BLK) signal (a), charge storage (b) in the CCD image pick-up element 1, a signal charge read pulse (c) output from the CCD drive circuit 3, and a CCD output (d) which is read out by this timing of the pulse (c).

The CCD output (d) is sequentially stored in the frame memories 9 and 10 alternately every frame data unit. Charts (e) and (f) show timings of these memory storage operations. The pixel data read out from the frame memory 9 or 10 are supplied to the adder circuit 14 and the shift registers 12 and 13 through a suitable connection of the switches 7 and 8. The four pixel data from the memory 9 or 10 and from the shift registers 12 and 13 are added in the adder circuit 14. The output data of the adder circuit 14 is converted into an analog signal by the D/A converter 15, resulting in a camera output (g)

The signal processing in the respective circuit portions mentioned above will be described as a flow of signal. Signal charge stored in respective photo diodes 16, 17 and 18 (FIGS. 3 and 4) of the CCD image pick-up element 1 over a charge storage period T11 (1/30 seconds) are read out to a CCD 19 (FIG. 3) of the CCD image pick-up element 1 simultaneously at a timing of 1/30 seconds respectively by a signal charge read pulse 20 at a time instance t11. In the CCD image pick-up element 1 which is scanned progressively, the signal charge from the respective photo diodes are sequentially transferred, independently, from each other in the vertical CCD 19 and, then, transferred to a horizontal CCD (not shown). Accordingly, image data of all pixels are read out by one progressive scan and intermittently read out as an analog video signal 21 once every 1/30 seconds, as the output (d).

The analog video signal 21 is converted into a digital video signal by the A/D converter 5 and then the resultant digital signal is written in the frame memories 9 and 10, alternately, through the signal switch 6. The digital video signal 22 is read out from the frame memory 9. In detail, while reading, video signals of adjacent two lines are read out simultaneously and supplied, through the signal switches 7 and 8, to the adder circuit 14 and the shift registers 12 and 13. The two lines to be read out simultaneously from the frame memory 9 or 10 are selected such that, in order to convert the progressive scan to the interlace scan, the odd number field is offset from the even number field by 1 line. Namely, assuming that the progressive scan constitutes lines 1, 2, 3, . . . , the set of the two lines to be simultaneously read out is (1, 2), (3, 4), (5, 6), ... in the odd number field and the set is (2, 3), (4, 5), ( 6, 7 ) , . . . in the even number field. Accordingly, the four pixels to be added in the adder circuit 14 on the adjacent lines are adjacent vertically and horizontally, and such relation is expressed as shown in FIG. 4.

The digital video signal output from the adder circuit 14 is passed through the D/A converter 15 and output as analog video signals 23 and 24 of the odd number field and the even number field, as shown in (g) of FIG. 2.

In the signal charge processing mentioned above, the signal amplitude becomes four times by the addition of the 4 pixels. Further, since the increase of a random noise is only twice, the sensitivity becomes twice. Therefore, the sensitivity of this embodiment including the storage of signal charge of 1/30 seconds becomes twice as in the case of the conventional high sensitivity CCD television camera shown in FIGS. 9 to 12.

The sampling points of the odd number field and the even number field are shown by black circle ● and black triangle ▲ in FIG. 4. Since the sampling points are offset from each other by one line as shown, the vertical resolution of a CCD of NTSC system in which, for example, 490 pixels are arranged vertically becomes 350 TV as in the usual driving shown in FIGS. 5 to 8.

As described, the high sensitivity television camera of the present invention reads and stores out the signal charge in progressive scan manner and, then, the stored signal is read out while adding four pixels data adjacent vertically and horizontally. Therefore, the output signal thus obtained by adding the adjacent four pixels is improved in sensitivity while preventing degradation of resolution according to the conventional adding processing for the interlace scan. Further, a signal-to-noise (S/N) ratio can be improved by the addition of the adjacent pixel data.

As described, according to the present invention, it is possible to obtain the same high resolution as that obtainable by the usual drive television camera, while maintaining the sensitivity as high level as achievable by the conventional high sensitivity television camera of the storage time control system.

Although, in the above embodiment, the image pick-up element has been described as constructed with the CCD, the present invention is not limited thereto and the present invention can be applied to a camera using other solid state image pick-up elements such as MOS or CMD (charge modulation device) or an image pick-up tube.

Further, although, in the described embodiment, the storage time is twice that in the usual driving, that is, 1/30 seconds, the present invention is of course applicable to other storage time such as 1/15, 1/8 seconds, 1/4 seconds.

Further, although, in the described embodiment, the signals of two fields are produced from the signal of one frame, it is possible to improve an unnatural movement due to the storage time control system by adding a movement compensation circuit which may perform an arithmetic operation between frames which are adjacent in time axis.

That is, it should be noted that the described embodiment is a mere preferred embodiment and the present invention is not limited thereto and that the embodiment can be modified in various manners within the scope of the present invention which is defined by the attached claims.

What is claimed is:

1. A high sensitivity television camera comprising:
   pick-up means capable of being scanned progressively;
   storage time control means for controlling a storage time of said pick-up means;
   frame memory means for storing image data obtained by reading an amount of electric signal charge stored during the storage time; and
   adder means for adding the image data corresponding to four pixels of the image data stored in said frame memory means, which are adjacent vertically and horizontally to each other in a frame, wherein an output signal is formed from the image data added by said adder means.

2. A high sensitivity television camera as defined in claim 1, wherein said frame memory means includes a pair of memory circuits, said pair of memory circuits storing the image data alternately in a frame unit.

3. A high sensitivity television camera as claimed in claim 1, further comprising two 1-bit delay means, wherein the image data of vertically adjacent lines stored in the frame memory means are read out and horizontally adjacent image data are produced by passing the read out image data through the two 1-bit delay means and wherein the four pixels are the vertical and horizontal adjacent image data.

4. The high sensitivity television camera as claimed in claim 1, wherein the adding processing of the four pixels is performed correspondingly to odd and even number fields in an interlace scan, respectively.

\* \* \* \* \*